(12) United States Patent
Zeng

(10) Patent No.: US 9,328,897 B2
(45) Date of Patent: May 3, 2016

(54) EDGE-ILLUMINATION TYPE BACKLIGHT MODULE AND LIQUID CRYSTAL DISPLAY USING THE SAME

(75) Inventor: Dawei Zeng, Guangdong (CN)

(73) Assignee: SHENZHEN CHINA STAR OPTOELECTRONICS TECHNOLOGY CO., LTD., Shenzhen, Guangdong (CN)

( * ) Notice: Subject to any disclaimer, the term of this patent is extended or adjusted under 35 U.S.C. 154(b) by 261 days.

(21) Appl. No.: 13/695,420

(22) PCT Filed: Sep. 14, 2012

(86) PCT No.: PCT/CN2012/081404
§ 371 (c)(1),
(2), (4) Date: Oct. 30, 2012

(87) PCT Pub. No.: WO2014/023058
PCT Pub. Date: Feb. 13, 2014

(65) Prior Publication Data
US 2014/0043852 A1    Feb. 13, 2014

(30) Foreign Application Priority Data
Aug. 8, 2012    (CN) .......................... 2012 1 0280544

(51) Int. Cl.
*G02F 1/13357*  (2006.01)
*G02B 6/00*     (2006.01)
*F21V 7/00*     (2006.01)
*F21V 8/00*     (2006.01)

(52) U.S. Cl.
CPC ................ *F21V 7/00* (2013.01); *G02B 6/0031* (2013.01); *G02B 6/0091* (2013.01)

(58) Field of Classification Search
CPC ............... G02F 1/133524; G02F 1/133615; G02B 6/0013; G02B 6/0018; G02B 6/0023; G02B 6/0031
USPC ................... 362/97.1, 615–616; 349/65, 67
See application file for complete search history.

(56) References Cited

U.S. PATENT DOCUMENTS

| 5,808,708 A    | 9/1998  | Oyama et al. |
| 6,788,358 B1 * | 9/2004  | Kim et al. ........................ 349/62 |
| 7,237,938 B2   | 7/2007  | Wang et al. |
| 2009/0262283 A1 * | 10/2009 | Olson et al. ...................... 349/65 |
| 2010/0118563 A1 * | 5/2010  | Shen et al. ..................... 362/607 |

FOREIGN PATENT DOCUMENTS

| CN | 1975535 A    | 6/2007  |
| CN | 101561579 A  | 10/2009 |
| JP | 11-329041 A  | 11/1999 |

* cited by examiner

*Primary Examiner* — Karabi Guharay
(74) *Attorney, Agent, or Firm* — Muncy, Geissler, Olds & Lowe, P.C.

(57) ABSTRACT

Providing is an edge-illumination type backlight module, comprising a light guide bar comprising a light incident surface and a light exiting surface; a light source device for emitting a light to the light incident surface; a light guide plate comprising a light emitting surface and a light entrance surface, wherein the light emitting surface is disposed on a surface of the light guide plate, the light entrance surface is disposed at a lateral surface of the light guide plate, the light guide plate is adjacent to the light guide bar, the light exiting surface of the light guide bar faces to the light entrance surface of the light guide plate, and the light emitting surface of the light guide plate is vertical to a light emitting direction of the light source device; and an optical film disposed on the light emitting surface of the light guide plate.

1 Claim, 2 Drawing Sheets

EDGE-ILLUMINATION TYPE BACKLIGHT MODULE AND LIQUID CRYSTAL DISPLAY USING THE SAME

FIELD OF THE INVENTION

The present invention relates to an edge-illumination type backlight module and a liquid crystal display using the same, and more particularly to a structure increasing the light path by a light guide bar in the backlight module.

BACKGROUND OF THE INVENTION

In a liquid crystal display, because the liquid crystal itself cannot emit light, a backlight module is used to provide a uniform light source with enough illumination to the liquid crystal panel for displaying an image. Generally, the backlight module includes an edge-illumination type and a direct-illumination type, wherein a light source of the edge-illumination is disposed at a lateral side. The edge-illumination type has advantages in light-weight, compact in size, and low power consumption, such that it has usually been used as the screen of cell phones, personal digital assistants (PDA), and notebooks.

Referring to FIG. 1, it illustrates a top view of a partial structure according to a conventional edge-illumination type backlight module. As shown in FIG. 1, the conventional edge-illumination type backlight module 9 includes a light guide plate 920 and a light emitting diode (LED) 910, wherein the LED 910 emits a light source into the light guide plate 920.

Moreover, in the conventional edge-illumination type backlight module 9, "P" represents an interval between two adjacent LEDs, "A" represents a distance form an active area 930 of a display panel projected to the light guide plate to a light emitting surface of the LED 910, and A/P ratio can be used to judge a displayed image quality. When A/P ratio is higher, the image quality is better. Otherwise, when A/P ration is lower, the image quality is poor. In the case of high A/P ratio, the light guide plate 920 can provide a more uniform light source on the active area 930 of the display panel. On the other hand, in the case of low A/P ratio, the light guide plate 920 provides a uniform light source which causes a non-uniform illumination at the local area of the active area 930, such that a hot spot is produced that lowers the image quality.

In consideration of cost, power consumption, heat-dissipating, and environment protection, the number of LEDs must be decreased; therefore, under a situation without reducing panel sizes, the interval P between the LEDs 910 may be increased. However, under a situation without reducing the active area 930 of the display panel, the distance A from the light emitting surface of the LED 910 to the active area 930 projected on the light guide plate 920 cannot be increased due to the structure limitation in the conventional backlight module 9. Hence, A/P ratio cannot be improved, and the image quality is decreased.

Thereby, a backlight module reducing hot spot appearances and the liquid crystal display using the same to solve the above-mentioned problems are required.

SUMMARY

One objective of the present invention is to overcome the drawback of hot spot appearances produced on the optical films in the light source of the conventional edge-illumination type backlight module, such that a novel edge-illumination type backlight module is provided. The edge-illumination type backlight module according to the present invention can solve the problem caused by a short distance between a light emitting surface of a light source device and a light guide plate, which may generate a non-illumination at the local area of the light guide plate seriously affecting image qualities.

Another objective of the present invention is to overcome the drawback of hot spot appearances produced on the optical films in the light source of the conventional edge-illumination type backlight module of a liquid crystal, such that an edge-illumination type backlight module is provided. The novel liquid crystal display according to the present invention can solve the problem caused by a short distance between a light emitting surface of a light source device and a light guide plate, which may generate a non-illumination at the local area of the light guide plate seriously affecting image qualities.

To achieve above-mentioned objective, an edge-illumination type backlight module of the present invention is provided, which comprises a light guide bar comprising a light incident surface and a light exiting surface; a light source device for emitting a light to the light incident surface; a light guide plate comprising a light emitting surface and a light entrance surface, wherein the light emitting surface is disposed on a surface of the light guide plate, the light entrance surface is disposed at a lateral surface of the light guide plate, the light guide plate is adjacent to the light guide bar, the light emitting surface of the light guide plate faces to the light exiting surface of the light guide bar, and the light emitting surface of the light guide plate is vertical to a light emitting direction of the light source device; and an optical film, disposed on the light emitting surface of the light guide plate.

In one embodiment, the light guide bar further comprises a reflective surface for reflecting a light emitting from the light source device into the light guide plate.

In one embodiment, a reflector is adhered to the reflective surface.

In one embodiment, a cross-section of the light guide bar is a fan shape.

In one embodiment, a cross-section of the light guide bar is a right-angle shape.

To achieve above-mentioned objective, a liquid crystal display of the present invention is provided, which comprises a liquid crystal panel; and an edge-illumination type backlight module for providing a light source to the liquid crystal panel. The edge-illumination type backlight module comprises a light guide bar comprising a light incident surface and a light exiting surface; a light source device for emitting a light to the light entrance surface; a light guide plate comprising a light emitting surface and a light entrance surface, wherein the light emitting surface is disposed on a surface of the light guide plate, the light entrance surface is disposed at a lateral surface of the light guide plate, the light guide plate is adjacent to the light guide bar, the light emitting surface of the light guide plate faces to the light exiting surface of the light guide bar, and the light emitting surface of the light guide plate is vertical to a light emitting direction of the light source device; and an optical film, disposed on the light emitting surface of the light guide plate.

In one embodiment, the light guide bar further comprises a reflective surface for reflecting a light emitting from the light source device into the light guide plate.

In one embodiment, a reflector is adhered to the reflective surface.

In one embodiment, a cross-section of the light guide bar is a fan shape.

In one embodiment, a cross-section of the light guide bar is a right-angle shape.

As the foregoing, the edge-illumination type backlight module and the liquid crystal display using the same have an advantageous effect in that a distance between the light emitting surface of the LED and the light entrance surface of the light guide plate can be increased by using the light guide bar; moreover, cooperating with the reflective surface having an arc or inclined surface in the light guide bar, an illumination of the light source become more uniformly distributed into the light guide plate, so as to prevent the hot spot appearance from being produced.

The previous description of the present invention is only a schematic and brief illustration provided to enable a better understanding of the technical solution of the invention and to allow the practice of the invention according to the description. Hereinafter, the preferred embodiment of the present invention will be described in detail with reference to the accompanying drawings.

DETAILED DESCRIPTION

Now, the preferred embodiment of the present invention will be described in detail with reference to the accompanying drawings.

Figure 1:
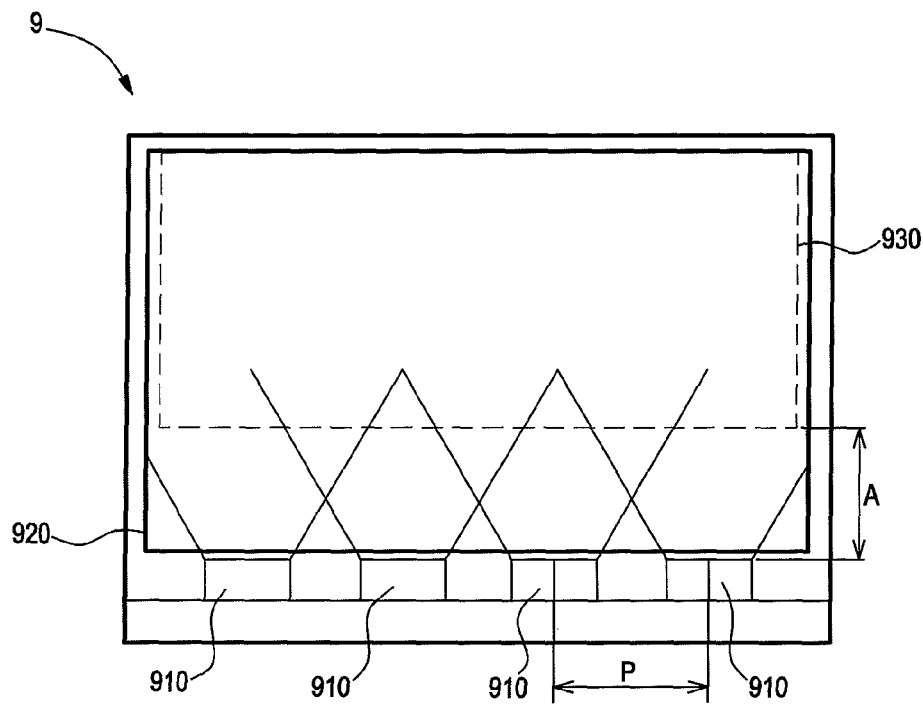
FIG. 1 illustrates a top view of a partial structure according to a conventional edge-illumination type backlight module.
Figure 2:
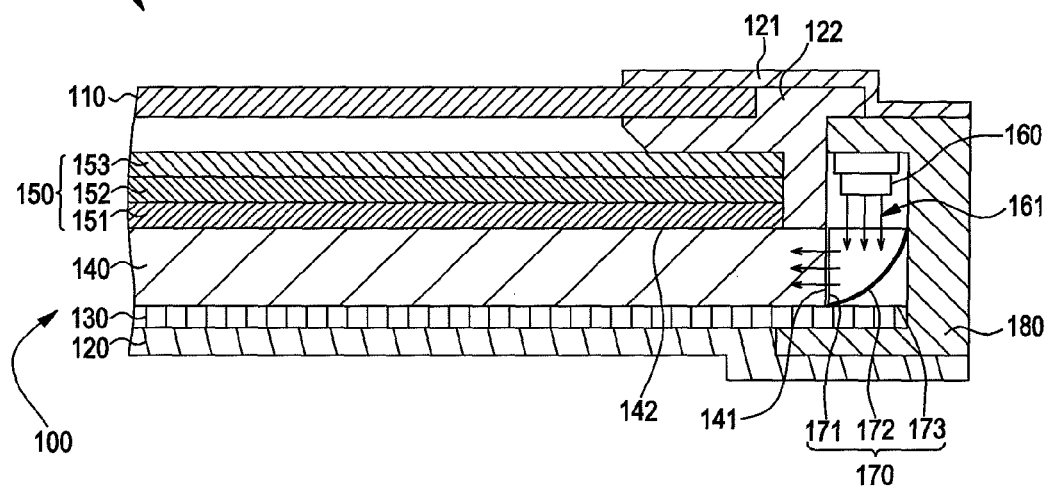
FIG. 2 illustrates a partial cross-section view of a liquid crystal display according to a first embodiment of the present invention.

FIG. 2 illustrates a partial cross-section view of a liquid crystal display according to a first embodiment of the present invention. As shown in FIG. 2, a liquid crystal display 1 comprises a liquid crystal panel 110, an edge-illumination type backlight module 100, a back cover 120, a front frame 121, and a middle bezel 122.

The edge-illumination type backlight module 100 is disposed on the back cover 120, and the middle bezel 122 is disposed on the edge-illumination type backlight module 100. That is, the edge-illumination type backlight module 100 is disposed between the middle bezel 122 and a back cover 120. The liquid crystal panel 110 is disposed on the edge-illumination type backlight module 100, the middle bezel 122 is disposed between the edge-illumination type backlight module 100 and the liquid crystal panel 110, and the front frame 121 is disposed on the liquid crystal panel 110. That is, the liquid crystal panel 110 is disposed between the front frame 121 and the middle bezel 122. The front frame 121, the middle bezel 122, and the back cover 120 mainly are used to fix the liquid crystal panel 110 and the edge-illumination type backlight module 100.

The edge-illumination type backlight module 100 comprises a light guide bar 170, a light source device 160, a light guide plate 140, an optical film 150, a reflective layer 130 and a heat-dissipating member 180. Wherein, the light guide bar 170 comprises a light incident surface 173, a light exiting surface 171, and a reflective surface 172; here the light guide plate 140 comprises a light emitting surface 142 and a light entrance surface 141 adjacent to the light emitting surface 142.

The light source device 160 is fixed on the heat-dissipating member 180. When the light source device 160 emits a light 161 to the light incident surface 173 of the light guide bar 170, the thermal energy produced by the light source device 160 is conducted into air through the heat-dissipating member 180. The light emitting surface 142 of the light guide plate 140 is vertical to a light emitting direction of the light source device 160. In addition, a side view of the liquid crystal display 1 is shown in FIG. 2. The light source device 160 emits the light 161 from top to bottom, and the light source device may be a light emitting diode (LED).

The light guide bar 170 is disposed under the light source device 160, and the light incident surface 173 of the light guide bar 170 faces to the light source device 160, wherein the cross-section of the light guide bar 170 is a fan shape. The light guide bar 170 includes the light incident surface 173 and the light exiting surface 171; an arc surface of the light guide bar 170 is the reflective surface 172, and a reflector 172a is adhered to the reflective surface 172. When the light source device 160 emits a light 161, the light 161 is incident from the light incident surface of the light guide bar 170, is reflected by the reflective surface 172, and then is emitting the light 161 from the light exiting surface 171.

The light guide plate 140 is disposed between the back cover 120 and the middle bezel 122, and adjacent to the light guide bar 170. The light entrance surface 141 of the light guide plate 140 faces to the light exiting surface 171 of the light guide bar 170.

The optical film 150 is disposed on the light guide plate 140 and between the middle bezel 122 and the light guide plate 140. A diffusion sheet 151, a prism sheet 152, and a protective diffusion film 153 are arranged sequentially from bottom to top.

The reflective layer 130 is disposed under the light guide plate 140, and between the back cover 120 and the light guide plate 140.

Figure 3:
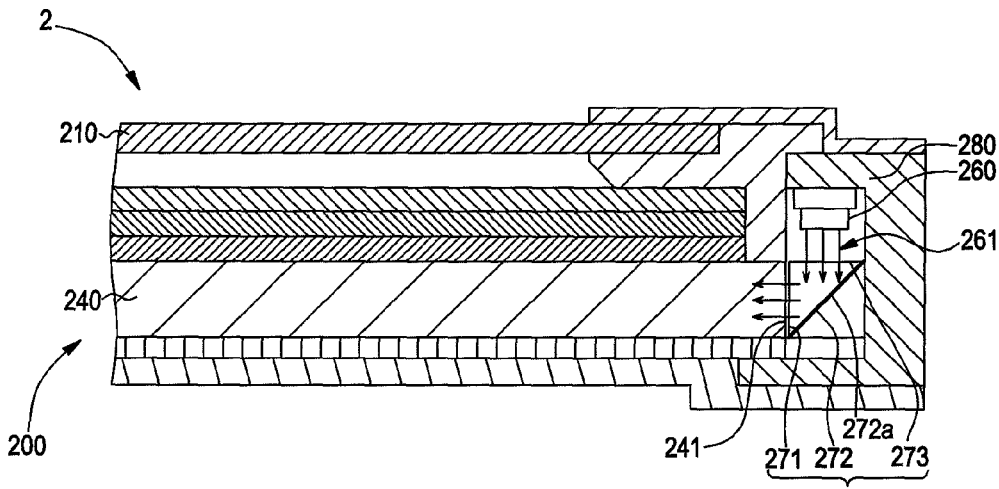
FIG. 3 illustrates a partial cross-section view of a liquid crystal display according to of a second embodiment of the present invention.

FIG. 3 illustrates a cross-section of a partial liquid crystal display according to a second embodiment of the present invention. As shown in FIG. 3, a liquid crystal panel 210 and an edge-illumination type backlight module 200 are fixed in the same way as that of the first embodiment, but are not described herein. Wherein, the second embodiment and the first embodiment are different in the structure and the position of a light guide bar 270 of the edge-illumination type backlight module 200.

A light source device 260 is fixed on a heat-dissipation member 280. When the light source device 260 emits a light 261 to a light incident surface 273 of the light guide bar 270, the thermal energy produced by the light source device 260 is conducted into air through the heat-dissipating member 280. The light emitting surface of a light guide plate 240 is vertical to a light emitting direction of the light source device 260. In addition, a side view of the liquid crystal display 2 is shown in FIG. 3. The light source device 260 emits the light 261 from top to bottom.

The light guide bar 270 is disposed under the light source device 260, and the light incident surface 273 of the light guide bar 270 faces to the light source device 260, wherein the cross-section of the light guide bar 270 is a right-angle shape. The light guide bar 270 includes the light incident surface 273 and a light exiting surface 271; an inclined surface of the light guide bar 270 is a reflective surface 272, and a reflector 272a is adhered to the reflective surface 272. When the light source device 260 emits the light 261, the light 261 is incident from the light incident surface of the light guide bar 270, is reflected by the reflective surface 272, and then is emitting the light 261 from the light exiting surface 271. Alternately, the light guide bar 270 may be a prism which can reflect the light 261 entering from the light incident surface 273 to the light exiting surface 271 of the light guide bar 270 by using total reflections.

Figure 4:
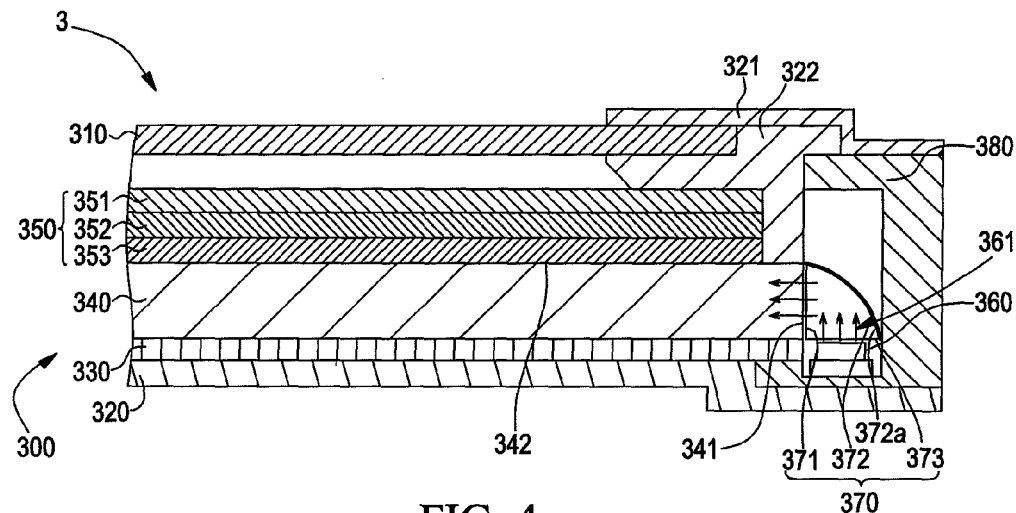
FIG. 4 illustrates a partial cross-section view of a liquid crystal display according to of a third embodiment of the present invention.

FIG. 4 illustrates a cross-section of a partial liquid crystal display according to a third embodiment of the present invention. As shown in FIG. 4, the liquid crystal display 3 comprises a liquid crystal panel 310, an edge-illumination type backlight module 300, a back cover 320, a front frame 321, and a middle bezel 322.

The edge-illumination type backlight module 300 is disposed on the back cover 320, and the middle bezel 322 is disposed on the edge-illumination type backlight module 300. That is, the edge-illumination type backlight module 300 is disposed between the middle bezel 322 and the back cover 320. The liquid crystal panel 310 is disposed on the edge-illumination type backlight module 300, the middle bezel 322 is disposed between the edge-illumination type backlight module 300 and the liquid crystal panel 310, and the front frame 321 is disposed on the liquid crystal panel 310. That is, the liquid crystal panel 310 is disposed between the front frame 321 and the middle bezel 322. The front frame 321, the middle bezel 322, and the back cover 320 are mainly used to fix the liquid crystal panel 310 and the edge-illumination type backlight module 300.

The edge-illumination type backlight module 300 comprises a light guide bar 370, a light source device 360, a light guide plate 340, an optical film 350, a reflective layer 330 and a heat-dissipating member 380. Wherein, the light guide bar 370 comprises a light incident surface 373, a light exiting surface 371, and a reflective surface 372; the light guide plate 340 comprises a light emitting surface 342 and a light entrance surface 341 adjacent to the light emitting surface 342.

The light source device 360 is fixed on the heat-dissipating member 380. When the light source device 360 emits a light 361 to the light incident surface 373 of the light guide bar 370, the thermal energy produced by the light source device 360 is conducted into air through the heat-dissipating member 380. The light emitting surface 342 of the light guide plate 340 is vertical to a light emitting direction of the light source device 360. In addition, a side view of the liquid crystal display 3 is shown in FIG. 4. The light source device 360 emits the light 361 from top to bottom.

The light guide bar 370 is disposed above the light source device 360, and the light incident surface 373 of the light guide bar 370 faces to the light source device 360, wherein the cross-section of the light guide bar 370 is a fan shape. The light guide bar 370 includes the light incident surface 373 and the light exiting surface 371; an arc surface of the light guide bar 370 is the reflective surface 372, and a reflector 372a is adhered to the reflective surface 372. When the light source device 360 emits a light 361, the light 361 is incident from the light incident surface of the light guide bar 370, is reflected by the reflective surface 372, and then is emitting the light from the light exiting surface 371.

The light guide plate 340 is disposed between the back cover 320 and the middle bezel 322, and adjacent to the light guide bar 370. The light entrance surface 341 of the light guide plate 340 faces to the light exiting surface 371 of the light guide bar 370.

The optical film 350 is disposed on the light guide plate 340 and between the middle bezel 322 and the light guide plate 340. A diffusion sheet 351, a prism sheet 352, and a protective diffusion film 353 are arranged sequentially from bottom to top.

The reflective layer 330 is disposed under the light guide plate 340, and between the back cover 320 and the light guide plate 340.

Figure 5:
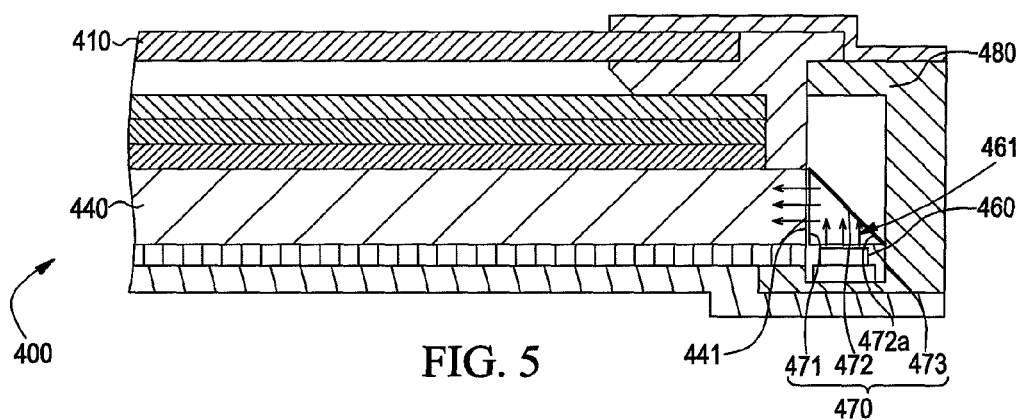
FIG. 5 illustrates a partial cross-section view of a liquid crystal display according to of a fourth embodiment of the present invention.

FIG. 5 illustrates a cross-section of a partial liquid crystal display according to a fourth embodiment of the present invention. As shown in FIG. 5, a liquid crystal panel 410 and an edge-illumination type backlight module 400 are fixed in the same way as that of the third embodiment, but are not described herein. Wherein, the fourth embodiment and the third embodiment are different in the structure and the position of a light guide bar 470 of the edge-illumination type backlight module 400.

A light source device 460 is fixed on a heat-dissipation member 480. When a light source device 460 emits a light 461 to a light incident surface 473 of the light guide bar 470, the thermal energy provided by the light source device 460 is conducted into air through the heat-dissipating member 480. A light emitting surface of a light guide plate 440 is vertical to a light emitting direction of the light source device 460. In addition, a side view of the liquid crystal display 4 is shown in FIG. 5. The light source device 460 emits the light 461 from top to bottom.

The light guide bar 470 is disposed above the light source device 460, and the light incident surface 473 of the light guide bar 470 faces to the light source device 460, wherein the cross-section of the light guide bar 470 is a right-angle shape. The light guide bar 470 includes the light incident surface 473 and a light exiting surface 471; an inclined surface of the light guide bar 470 is a reflective surface 472, and a reflector 472a is adhered to the reflective surface 472. When the light source device 460 emits a light 461, the light 461 is incident from the light incident surface of the light guide bar 470, is reflected by the reflective surface 472, and then is emitting the light from the light exiting surface 471. Wherein, the light guide bar 470 may be a prism which can reflect the light 461 entering from the light incident surface 473 to the light exiting surface 471 of the light guide bar 470 by using total reflections.

As the foregoing, the edge-illumination type backlight module and the liquid crystal display using the same have an advantageous effect in that a distance between the light emitting surface of the LED and the light entrance surface of the light guide plate can be increased by using the light guide bar; moreover, cooperating with the reflective surface having an arc or inclined surface in the light guide bar, an illumination of the light source become more uniformly distributed into the light guide plate, so as to prevent the hot spot appearance from being produced.

The previous description of the preferred embodiment is provided to further describe the present invention, not intended to limit the present invention. Any modification apparent to those skilled in the art according to the disclosure within the scope will be construed as being included in the present invention.

What is claimed is:
1. An edge-illumination type backlight module, comprising:
    a light guide bar, comprising a light incident surface and a light exiting surface, and a cross-section of the light guide bar is a fan shape;
    a light source device for emitting a light to the light incident surface, wherein the light guide bar is disposed under the light source device and the light source device is fixed on a heat-dissipation member;

a light guide plate, comprising a light emitting surface and a light entrance surface, wherein the light emitting surface is disposed on a surface of the light guide plate, the light entrance surface is disposed at a lateral surface of the light guide plate, the light guide plate is adjacent to the light guide bar, the light exiting surface of the light guide bar faces to the light entrance surface of the light guide plate, and the light emitting surface of the light guide plate is vertical to a light emitting direction of the light source device; and an optical film, disposed on the light emitting surface of the light guide plate;

wherein, the light guide bar further comprises a reflective surface for reflecting a light emitting from the light source device into the light guide plate, and a reflector is adhered to the reflective surface, and wherein the light guide bar and the light guide plate are not integrally formed.

\* \* \* \* \*